(12) United States Patent
Guigné et al.

(10) Patent No.: US 11,397,237 B2
(45) Date of Patent: Jul. 26, 2022

(54) AIRCRAFT ACOUSTIC POSITION AND ORIENTATION DETECTION METHOD AND APPARATUS

(71) Applicant: Intelligent Sciences Ltd., Newfoundland (CA)

(72) Inventors: Jacques Y. Guigné, Paradise (CA); Nicholas G. Pace, Bath (GB)

(73) Assignee: Intelligent Sciences Ltd., Newfoundland (CA)

(*) Notice: Subject to any disclaimer, the term of this patent is extended or adjusted under 35 U.S.C. 154(b) by 734 days.

(21) Appl. No.: 16/282,937

(22) Filed: Feb. 22, 2019

(65) Prior Publication Data

US 2019/0187243 A1 Jun. 20, 2019

Related U.S. Application Data

(63) Continuation of application No. PCT/CA2016/050999, filed on Aug. 25, 2016.

(51) Int. Cl.
*G01S 5/22* (2006.01)
*G01S 5/24* (2006.01)
*G01S 5/26* (2006.01)
*G01C 5/00* (2006.01)
*G01S 5/30* (2006.01)
*G01S 5/18* (2006.01)

(52) U.S. Cl.
CPC ............. *G01S 5/22* (2013.01); *G01C 5/005* (2013.01); *G01S 5/186* (2013.01); *G01S 5/24* (2013.01); *G01S 5/26* (2013.01); *G01S 5/30* (2013.01)

(58) Field of Classification Search
None
See application file for complete search history.

(56) References Cited

U.S. PATENT DOCUMENTS

| 4,097,837 A * | 6/1978 | Cyr ......................... G01S 15/74 367/6 |
| 4,567,483 A | 1/1986 | Bateman et al. |
| 6,608,593 B2 | 8/2003 | Holt |
| 6,980,152 B2 | 12/2005 | Steadman et al. |

(Continued)

FOREIGN PATENT DOCUMENTS

| CN | 105824011 A | 8/2016 |
| WO | 2008135289 A2 | 11/2008 |
| WO | 20160094849 A1 | 6/2016 |

OTHER PUBLICATIONS

Australian Examination Report dated Oct. 7, 2017; Australian Application No. 2016420400.

(Continued)

*Primary Examiner* — Hovhannes Baghdasaryan
(74) *Attorney, Agent, or Firm* — Richard A. Fagin

(57) ABSTRACT

A method for determining position of an aircraft with reference to a location on the ground includes transmitting an acoustic signal from a position on the aircraft to an array of spaced apart acoustic sensors proximate the location. The method includes at least one of (i) determining a time difference of arrival of the acoustic signal between each of the acoustic sensors and a reference acoustic sensor and (ii) determining an arrival time of the acoustic signal at each of the spaced apart acoustic sensors. The position of the aircraft is determined from the time differences of arrival and/or the arrival times.

10 Claims, 3 Drawing Sheets

(56) References Cited

U.S. PATENT DOCUMENTS

| | | | |
|---|---|---|---|
| 7,365,652 B2 | 4/2008 | Scherbarth | |
| 8,354,951 B2 | 1/2013 | Guigne et al. | |
| 8,493,263 B2 | 7/2013 | Pace et al. | |
| 2003/0142587 A1* | 7/2003 | Zeitzew | G01S 15/74 367/127 |
| 2008/0165621 A1* | 7/2008 | Fisher | G01S 5/22 367/118 |
| 2010/0020643 A1* | 1/2010 | Barger | G01S 3/8086 367/129 |
| 2011/0285590 A1* | 11/2011 | Wellington | G01C 21/20 342/417 |
| 2012/0326923 A1* | 12/2012 | Oehler | G01S 5/0284 342/357.29 |
| 2016/0247405 A1* | 8/2016 | Paczan | G08G 5/0013 |

OTHER PUBLICATIONS

International Search Report and Written Opinion, International Application No. PCT/CA2016/050999.

Examination Report, dated Mar. 26, 2020; United Kingdom Application No. GB1901915.7.

Canadian Office Action, dated May 7, 2020; Canadian Application No. 3,034,127.

Examination Report, dated Sep. 18, 2019; United Kingdom Application No. GB1901915.7.

Canadian Office Action, dated Nov. 10, 2021, for Canadian Application No. 3,034,127.

Australian Examination Report dated Mar. 1, 2022, Australian Application No. 2021200307.

* cited by examiner

AIRCRAFT ACOUSTIC POSITION AND ORIENTATION DETECTION METHOD AND APPARATUS

CROSS REFERENCE TO RELATED APPLICATIONS

Continuation of International Application No. PCT/CA2016/050999 filed on Aug. 25, 2016 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of detecting position and orientation of a rotary wing aircraft (helicopter) during final approach to landing. More specifically, the disclosure relates to acoustic-based methods and apparatus for determining the position of an aircraft and its orientation (pitch, roll, yaw) during approach for landing.

United States Defense Advanced Research Projects Agency (DARPA) Broad Agency Announcement No. BAA 06-45 requests solicitations for proposals to deal with affordable solutions to the problem of helicopter landing in brownout as well as other degraded visual environments (DVEs) such as whiteouts caused by snow and/or fog. Solutions are needed for the brownout phenomenon, which causes deadly accidents during helicopter landing and take-off operations in arid desert terrain. Intense, blinding dust clouds, which may be stirred up by the aircraft's main-rotor down-wash during near-ground flight can cause helicopter pilots to suddenly lose all visual cues. This creates significant flight safety risks from aircraft and ground obstacle collisions, rollover due to sloped and uneven terrain, etc.

U.S. Pat. No. 8,354,951 issued to Guigné et al. and U.S. Pat. No. 8,493,263 issued to Pace et al. describe various implementations of electromagnetic signal apparatus and methods that may be used to estimate position of an aircraft from a selected location on the ground.

There continues to be a need for improved measurement of position and orientation of aircraft for safe landing in low or no visibility conditions.

BRIEF DESCRIPTION OF THE DRAWINGS

FIG. 2 also shows equipment on the helicopter including a plurality of acoustic transmitters

DETAILED DESCRIPTION

Figure 1:
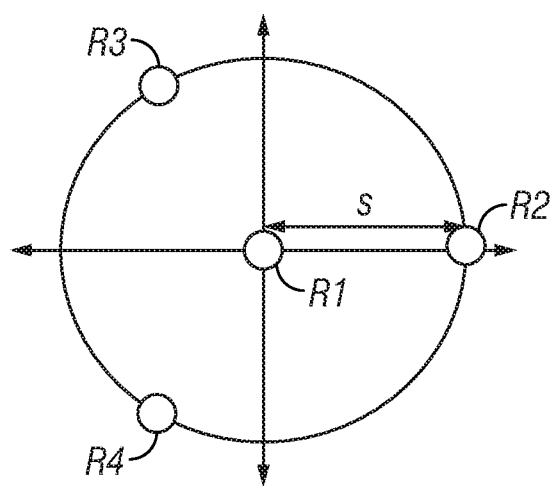
FIG. 1 shows an example implementation of acoustic signal receivers (or transmitters deployed on or proximate to a helicopter landing area.

The present disclosure relates to methods and apparatus for the landing of aircraft, e.g., helicopters during final approach to a landing site, for example, within about 50 meters of the landing site. In particular, landing in low visibility conditions such as fog, snow, rainstorms and most significantly, dust raised by the helicopter itself may be facilitated by methods and apparatus according to the present disclosure. Several example methods and apparatus are described herein below.

In some embodiments, the use of broadband acoustic energy facilitates determining the time of arrival (or time difference of arrival) of the acoustic energy from a transmission point on the aircraft and receivers on the ground (or the reciprocal thereof) and for time domain beamforming to locate the aircraft. In some embodiments determination of angle of arrival of acoustic energy at a point on the aircraft from each of a plurality of spaced apart sources on the ground to determine aircraft position may be facilitated by using narrow band acoustic energy.

1. Broad Band Acoustic Energy for Position Determination

Time of travel or time of arrival measurement of acoustic signals between the aircraft (helicopter) and sensor(s) proximate the landing site may use one or more broadband acoustic energy source(s) on the aircraft together with several acoustic sensors disposed in a selected pattern on the ground proximate the landing site. Radio frequency electromagnetic communication between the landing site and the helicopter may be used in some embodiments to enable position measurements and guidance updates to be received by the aircraft pilot and additionally enables, in some embodiments, accurate synchronization of the landing site sensors with acoustic transmitter(s) on the aircraft. Electromagnetic communication in the context of acoustic travel time measurements to determine helicopter position and orientation may be generally described as substantially "zero latency" communication.

The acoustic signals may be in the form of coded signals, and travel times may be obtained by measuring positions in time of peaks in a cross correlation between detected acoustic signals and reference acoustic signals. In some embodiments, a plurality of different coded signals may have substantially zero cross-correlation between them to facilitate identifying which signal corresponds to a particular acoustic source or acoustic sensor.

In one example embodiment, one acoustic energy source may be disposed on the aircraft and at least three acoustic receivers may be disposed on the ground proximate the landing site in a selected pattern. The acoustic receivers may be spaced, for example, about a meter or so apart to enable provision of several accurate updates per second of the helicopter position with reference to the acoustic receivers near the landing site.

In other example implementations there may be at least three spaced apart acoustic sources disposed on the helicopter. The spacing may be along different directions with reference to the center of rotation of the aircraft. In such implementations, yaw, pitch and roll of the aircraft with reference to the center of rotation can be determined.

The acoustic sensors may be deployed in a unit array, which can be a lightweight, portable assembly (less than 2 kg excluding electromagnetic communication and signal processing devices) and easily carried and deployed by one person, to have three or more receivers mutually spaced apart at the landing side (in some embodiments at about 50 cm from each other).

Methods according to the present disclosure may have the advantage that accuracy increases as helicopter height decreases.

At a helicopter height of 50 meters, for example, the helicopter position can readily be obtained to within 50 cm of the actual position, while at 10 meters height the positional uncertainty reduces to about 10 cm. Likewise the yaw, pitch and roll estimates improve as the aircraft height decreases, the accuracy of the foregoing being about 1 degree at 10 meters helicopter height. The foregoing accuracies may be maintained even in dust clouds, snow or other conditions where the visibility is essentially zero.

The methods and apparatus described herein are robust against ambient or helicopter noise and also against multiple acoustic travel path interference.

The transmitted acoustic signals may have an amplitude or power such that they have essentially no effect on covertness of the helicopter approach; covertness would be compromised, rather, by the helicopter noise itself rather than the signals used for position determination.

2. Example Embodiments of an Apparatus

FIG. 1 shows an example array of acoustic transducers deployed on the ground near a landing site as explained above. In the present example implementation the transducers may be acoustic sensors for detecting acoustic energy transmitted by at least one acoustic transducer operated as a transmitter and disposed on the helicopter (H in FIG. 2). A reference sensor R1 may be disposed in the middle of a circle of at least three other sensors R2, R3, R4 disposed on the perimeter of the circle. The perimeter sensors R2, R3, R4 may be deployed circumferentially equally spaced and each may be a same selected distance from the reference sensor R1. Other geometries for the array of sensors are also possible. Displacing the reference sensor R1 a selected distance above or below the plane of R2, R3, R4 may further improve the accuracy of the determined helicopter position. Displacing the perimeter sensors R2, R3, R4 from their nominal positions described above may provide spatial diversity in the array. Finally, additional perimeter sensors (not shown) can also augment the spatial diversity of the sensor array. The sensors R1, R2, R3, R4 can be ultrasonic transducers of types known in the art. As will be further explained below, reference to a "sensor" as being used to detect acoustic energy may be directly substituted by an acoustic transmitter to emit acoustic energy, and vice versa, by the principle of reciprocity.

Figure 2:
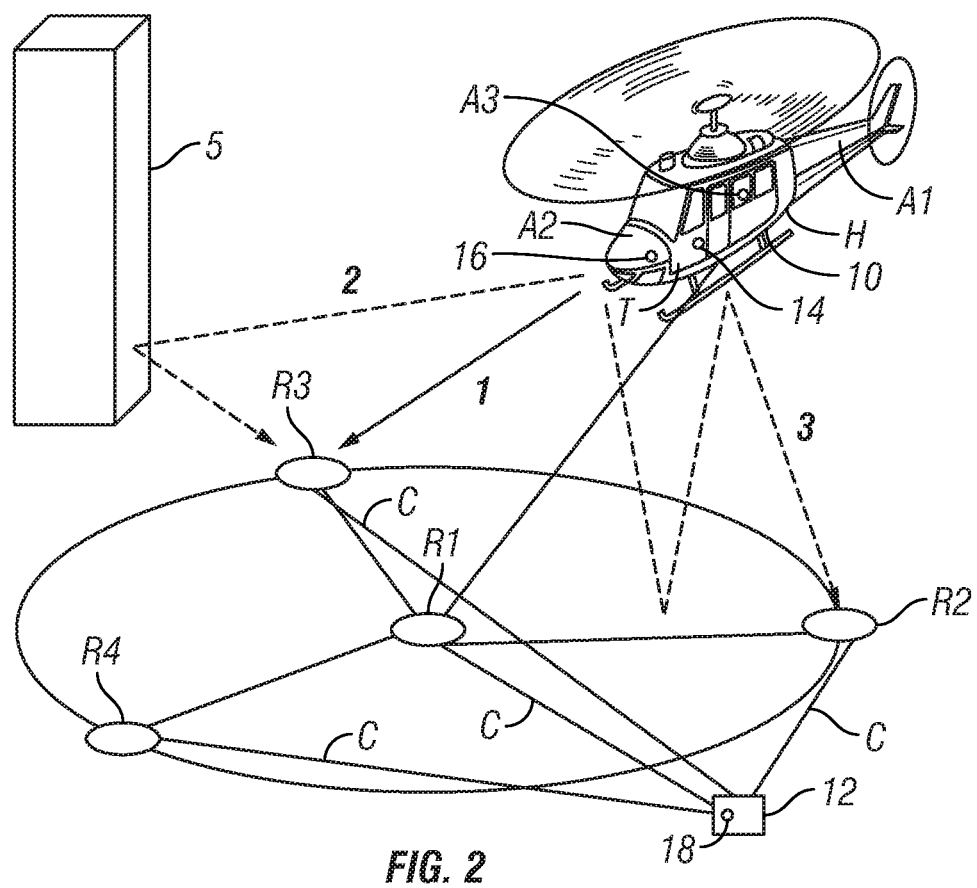
FIG. 2 shows a helicopter approaching the landing area in FIG. 1, wherein an obstacle to navigation is present and may be in the path of acoustic signals.
Figure 3:
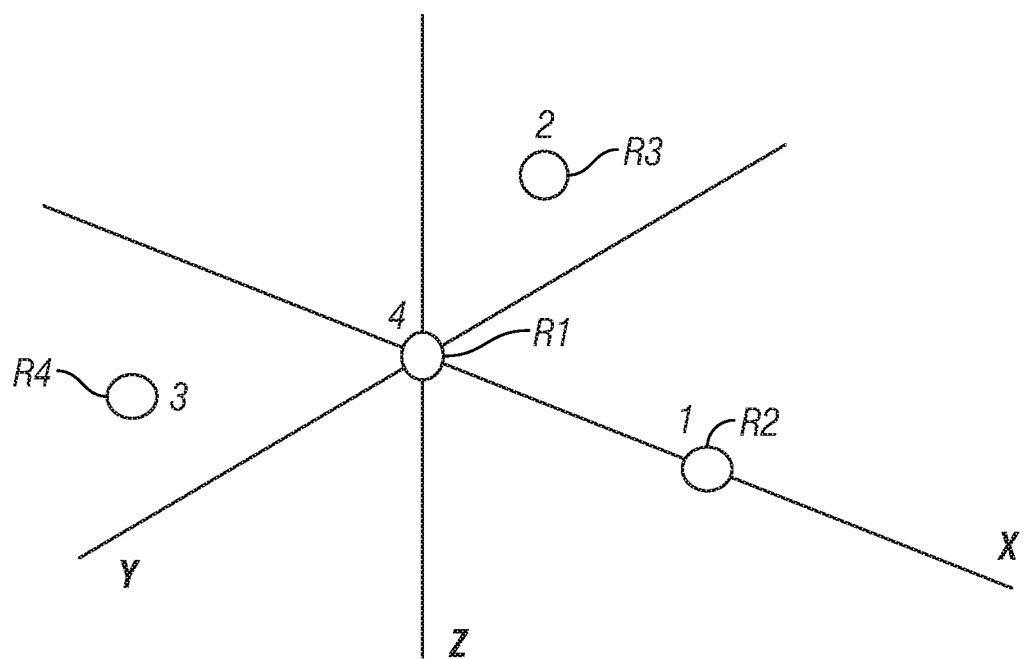
FIG. 3 shows an example location coordinate system with reference to the array of sensors shown in FIG. 1.

Referring to FIG. 2, an example position determination system is shown schematically. An acoustic energy source T as explained above is deployed on a helicopter H. The helicopter H may also include a forward altimeter A2 and an aft altimeter A1 to measure height above the ground of the forward and aft ends of the helicopter H, the altimeters A1, A2 may be substituted by additional acoustic energy sources to enable travel time or differential travel time determination of orientation of the helicopter H about its center of rotation.

The sensors R1, R2, R3, R4 may be deployed as explained above with reference to FIG. 1. A signal cable C may connect the output of each of the sensors R1, R2, R3, R4 to a signal processing unit 12 disposed on the ground. Another signal processing unit 10 may be disposed in the helicopter H. The signal radiated from the acoustic energy source T can reach the sensors R1, R2, R3, R4 by a direct travel path 1, be reflected from nearby objects 2, such as an obstacle to navigation 5, and as the helicopter approaches the ground, by scatter 3 (multiple reflections) from the helicopter H itself.

Figure 4:
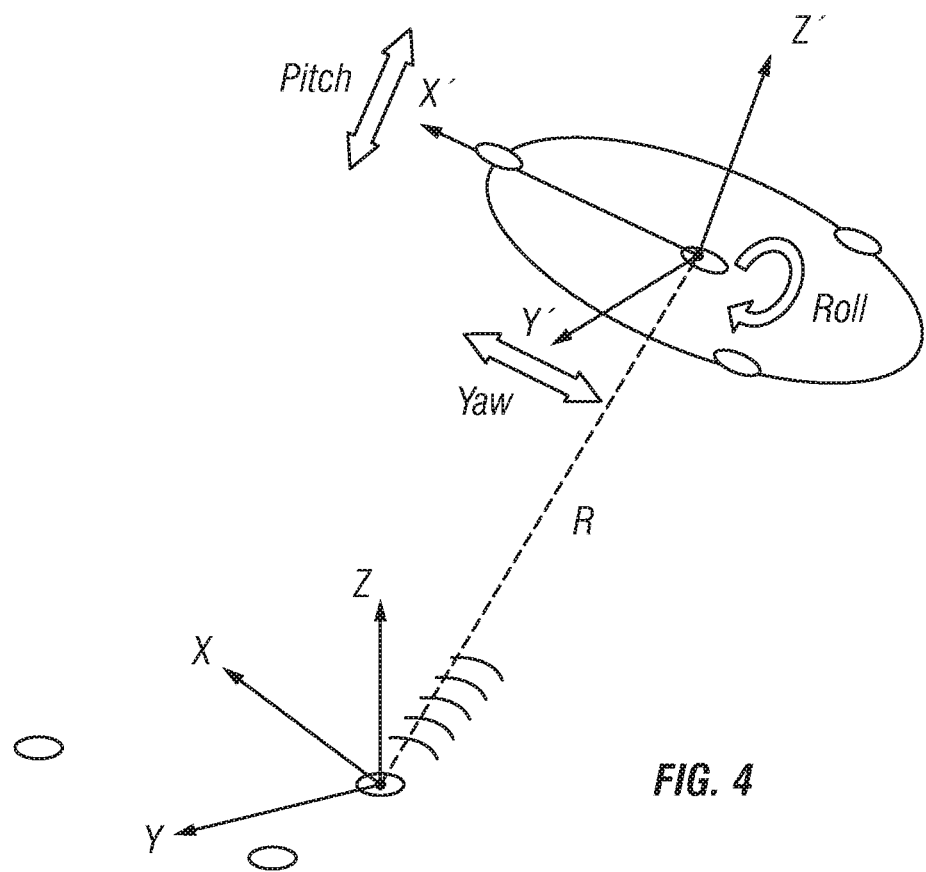
FIG. 4 shows an example apparatus deployed as an integral part of the airframe of the helicopter being capable of determining the relative position vector R of one or more acoustic transducers in the stationary reference frame X, Y, Z of the landing area relative to the moving reference frame X', Y', Z' of the helicopter.

An alternative embodiment of the apparatus deployed as an integral part of the airframe of the helicopter H and one or more acoustic sources deployed in the reference frame of the landing pad. (See FIG. 4) In this embodiment both the relative position and the relative orientation of the helicopter H may be determined with respect to the landing site. In particular, the additional measurements related to orientation are particularly important with respect to the safe operation of a helicopter in brownout conditions, as the loss of visual orientation cues for the pilot is a major contributor to accidents. In aerospace applications, the orientation of an aircraft is defined by the so-called Tait-Bryan angles (related to the better known Euler angles) which are used to define the pitch, yaw and roll of the helicopter H. If the landing area is taken to be in a stationary reference frame X, Y Z (the desired final state of the helicopter) and the moving reference frame X' Y' Z' of the helicopter H is being dynamically measured by the apparatus, then bringing X' Y' Z' into coincidence with X, Y, Z by safe operation of the helicopter H may be obtained by substituting the measured position and orientation of the helicopter H for the position and orientation normally obtained visually by the pilot. The presentation of this data to the pilot may be easy and intuitive to interpret. This objective may be fulfilled by any one of a number of available display options that are part of the art of the helicopter H instrumentation. In embodiments where the distance measuring system is deployed on the helicopter H, the baselines between the sensors are constrained by the dimensions of the helicopter H, which limits the attainable accuracy of position relative to the landing site. The accrued benefit of this latter embodiment is the additional orientation information provided to the pilot.

Figure 5:
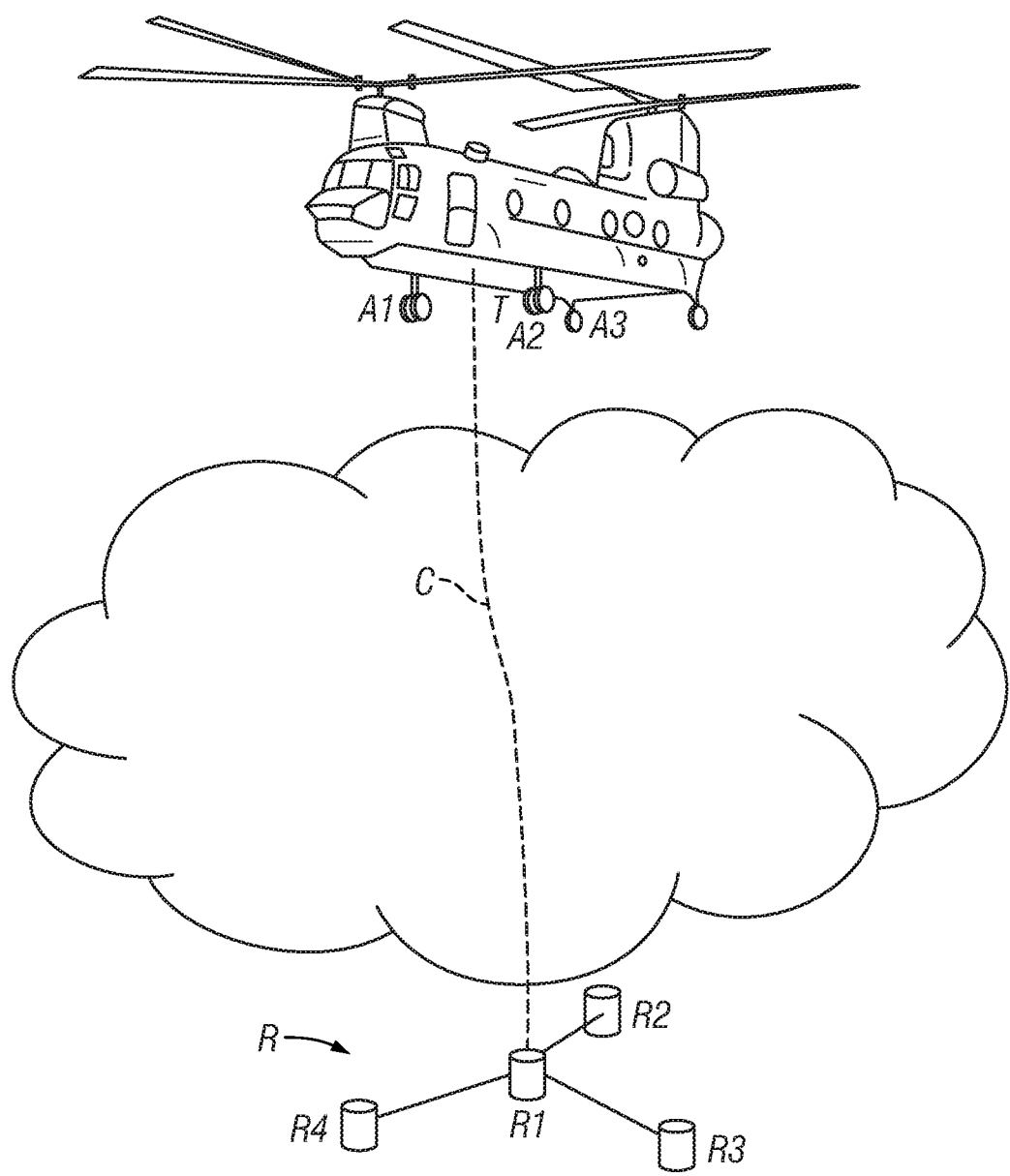
FIG. 5 shows deployment of an example implementation using a tether from a helicopter hovering above the brownout condition.

In some examples, e.g., "brownouts" due to dust raised by the helicopter itself, determining position may be of military importance when landing on unprepared sites. In such cases the pilot can select the landing site from above a height where the brownout exists. In one example, the pilot can lower a rope or cable C with the sensor array R coupled on the bottom end thereof. (See FIG. 5) On reaching the ground, the sensor array R can unfold like an umbrella and the sensors R1, R2, R3, R4 can then be deployed in the predetermined pattern. The deployment device may include a self-leveling attitude compensator. The position determination device may include a communications line or cable C to the aircraft H, or communication may be performed by electromagnetic (e.g., radio) communication devices. In some cases, an observer on the ground can ensure the position determination device R is deployed in the desired place. The pilot can then guide the helicopter landing on top of the position determination device R. On takeoff, the device R may be retrieved by the same cable C once the aircraft H has risen above any low visibility condition.

3. Time Domain Beamforming

In one implementation, time domain beamforming may be used. Time domain beamforming takes the output of a plurality of spaced apart acoustic receivers disposed at the landing site. The outputs of the receivers are summed after delaying each receiver output by an amount related to each of a plurality of assumed positions of the acoustic energy source(s). Scanning the summed output over a range of assumed acoustic energy source positions produces a maximum amplitude of the summed output if the assumed position coincides with the actual position.

4. Narrow Band Angular Measurement

In another example implementation, the angular positions of narrow band acoustic sources disposed on the ground proximate the landing site relative to the helicopter may be obtained using a stabilized directional receiver (14 in FIG. 2) on the helicopter (H in FIG. 2). The sources may substitute for the sensors R1-R4 shown in FIG. 1 and may be correspondingly arranged in a circular or other spaced apart pattern having known positions. Angles are measured from the helicopter H to each the several ground-based acoustic energy sources, and the helicopter position may be thus determined from the measured angles. The acoustic energy sources may each transmit acoustic energy at a slightly different single frequency from the other sources (thus providing narrow band energy). The accuracy increases as the landing nears. In the foregoing implementation there is no need for synchronization. Because the signal processing is performed on signals detected by the directional receiver 14 on the helicopter H, and angle calculations from the detected signals is not time dependent, no zero latency (e.g., electromagnetic) communication between the landing site and the helicopter H is required.

Multipaths (multiple travel paths of the acoustic signals as a result of reflection from objects proximate the landing site and/or the helicopter) may exist but they are of little consequence as the spatial filtering effect of the beamforming is very high. It is robust against ambient and helicopter noise.

Another possible arrangement of an apparatus is to dispose a plurality of spaced apart ground-based acoustic sensors at known locations proximate to the landing site, each capable of beam steering, and a single acoustic source located on the helicopter, e.g., as shown at T in FIG. 2. In this case the acoustic source T on the helicopter would not need to be stabilized and may transmit at a single frequency. This may be more appropriate for well established landing sites.

5. Time Measurement Techniques

If the helicopter (H in FIG. 2) can supply zero latency synchronization signals, for example, in the form of an electromagnetic signal transmitted at a known time referenced to transmission of the acoustic signals, then the determination of helicopter position may be based on time of arrival (TOA). If no synchronization signals are provided, then the determination of the helicopter position may use time difference of arrival (TDOA). The arrangement of acoustic receivers at the landing site for TOA may have an aperture as small as a radius of 25 cm while for TDOA an aperture of about 1.5 m may be used to provide accurate position determination. An electromagnetic transceiver is shown at 16 in FIG. 2 on the helicopter H and a corresponding transceiver is shown at 18 in FIG. 2 in the ground based signal processing unit 12.

In some embodiments, a minimum arrangement is three receivers on the ground proximate the landing site and one main acoustic energy source on the helicopter, e.g., T in FIG. 2. Three spaced apart acoustic sources, which may be collocated with the altimeters A1, A2 and A3 on the helicopter H may transmit separately identifiable acoustic signals. The foregoing signals may be used to calculate yaw, pitch and roll of the helicopter H. The update rate may be 4 times per second at 50 meters height and low visibility, which can be greater at lower heights and increased visibility.

TABLE 1

EXAMPLE RESULTS OF HELICOPTER COORDINATES EXTRACTED USING 3 SOURCES ON HELICOPTER AND 3 RECEIVERS ON THE GROUND MUTUALLY SPACED AT 50 CM USING TOA

| Height m | Standard deviations in m | | | Standard deviation in degrees | | |
|---|---|---|---|---|---|---|
| | X | Y | Z | yaw | pitch | roll |
| 50 | 0.33 | 0.38 | 0.38 | 5.1 | 4.5 | 9.2 |
| 25 | 0.17 | 0.19 | 0.17 | 2.6 | 2.4 | 4.8 |
| 15 | 0.10 | 0.11 | 0.11 | 1.6 | 1.6 | 3.0 |
| 10 | 0.07 | 0.08 | 0.08 | 1.14 | 1.25 | 2.21 |
| 5 | 0.04 | 0.04 | 0.05 | 0.69 | 0.92 | 1.40 |

Methods and apparatus according to the present disclosure may be based on acoustic signals in the range 10 kHz to 20 kHz. As previously stated, two basic implementations of acoustic travel time determination may be either (i) using a substantially zero latency (e.g., electromagnetic) time synchronization signal transmitted between a transceiver 16 in the helicopter H and a transceiver 18 in the ground signal processing unit 12 which allows measurement of time of arrival of signals (TOA); or (ii) if no time synchronization signal is used, the time difference of arrival (TDOA) between any two separated receivers as shown in FIG. 1 may be used to determine acoustic travel time from the helicopter position to known positions on the ground and thus the position in three dimensions of the helicopter at the position of the transducer T thereon.

The TOA approach is believed to be more accurate than TDOA. However, it is noted that zero latency (e.g., electromagnetic communication between the ground signal processing unit (12 in FIG. 2) and the helicopter is required to supply a synchronization signal, with effectively zero time latency.

The transmitted acoustic signals may be random signals generated from known source codes and the acoustic signals may be adjusted in duration and amplitude to account for the prevailing environmental conditions. In some embodiments, the coded signals may be generated by a source code generator conducted to a power amplifier. The source codes may be direct sequence spread spectrum (DSSS) codes, for example Gold codes, Kasami codes and maximum length codes which in the present embodiment may be configured to provide the transmitted acoustic signal with about 10 kHz bandwidth. The codes for each signal preferably have substantially zero correlation with each other to facilitate identification of each distinct signal even when the signals are transmitted substantially contemporaneously. In some embodiments, the acoustic signal duration may be about 0.25 seconds which allows four position calculations per second while also providing sufficient processing gain. TOA or TDOA may be determined by locating in time the position of an amplitude peak of the cross correlation between a signal from a receiver (see FIG. 2) and that of a reference signal. The reference signal may be stored in suitable data storage in the ground based signal processing unit (12 in FIG. 2) or may be transmitted from the helicopter using the electromagnetic transceiver (16 in FIG. 2) to communicate with the ground based signal processing unit (12 in FIG. 2) using a corresponding transceiver 18.

In the case of a single acoustic energy source, the reference signal may be the actual output of a reference receiver (e.g., R1 in FIG. 1) or may be a replica of the transmitted signal generated using the code corresponding to the code used to generate the transmitted signal.

When several acoustic transmitters are used simultaneously, each transmitter may be excited by a differently coded signal and a signal processor in communication with the receivers stores the codes and to which transmitter they apply, and can thus generate the appropriate replica for cross-correlation. At each receiver, the signals from the plurality of transmitters are superimposed on each other. Cross correlation of the total received signal from each receiver with an appropriate replica (e.g., as the code) of each individual transmitted signal provides, from the time of each cross-correlation peak value, the arrival time (TOA) or the time difference of arrival (TDOA) depending on whether a synchronization signal is used. See the transceivers 16 and 18 in FIG. 2.

Ambient noise and helicopter noise is uncorrelated with the transmitted coded signals and are discriminated during cross correlation. Further, if multiple acoustic signal paths are present, they provide smaller cross correlation peaks, later in time than the direct acoustic signal arrival time and may also thereby be discriminated. If there is only one acoustic energy source on the helicopter, e.g., T in FIG. 2, then determining position requires a plurality of spaced apart receivers on the ground proximate the landing site as shown in FIG. 2. As explained above, by the principle of reciprocity, reference herein to transmitter(s) on the helicopter (e.g., T in FIG. 2) and receivers (R1 through R4 in FIG. 2) on the ground proximate the landing site are functionally equivalent to receiver(s) on the helicopter H and transmitters on the ground proximate the landing site. However, if there is more than one source/receiver on the helicopter to enable determination of orientation (yaw, pitch, roll) of the helicopter, there still may be an array of sources/receivers on the ground.

The need for such arrangement of sensors and sources is a consequence of the yaw, pitch, and roll of the helicopter. The position of each of the plurality of the sources/receivers on the helicopter cannot be known or determined unless a plurality of spaced apart sensors/sources on the ground is available. What follows is a description of various implementations of acoustic sources and acoustic receivers, as well as calculation of required signal to noise ratio (SNR) and acoustic source power required to obtain reliable position and orientation calculations from TOA and/or TDOA measurements.

6. Single Source on the Helicopter and Array of Acoustic Receivers on the Ground A single acoustic sensor may be disposed on the helicopter, e.g., at T in FIG. 2 and a "ground array" may comprise a plurality of acoustic energy sources, e.g., at R1 through R4 in FIG. 2 may be disposed proximate a landing site. By the principle of reciprocity as explained above, a single acoustic source may be located on the helicopter and a ground array of spaced apart acoustic sensors may be disposed on the ground surface proximate a landing site substantially as explained with reference to FIG. 2.

A single source may transmit a coded signal from a known source code, e.g., from DSSS codes as explained above. The output of one of the acoustic sensors in the array if an arrangement such as shown in FIG. 2 is used, may provide a reference signal. Cross correlation of the signal from the other acoustic sensors with the reference signal may provide TDOA between the reference sensor and the other sensors. Processing of TDOA may be used to provide the coordinates of the acoustic energy source on the helicopter, e.g., T in FIG. 2, as will be further explained below.

If the acoustic energy source signal generator and associated circuitry communicates with the acoustic sensor circuitry using a substantially zero latency communication channel, e.g., electromagnetic signals (see 16 and 18 in FIG. 2) and supplies either the transmitted signal code or a synchronization signal, then the actual transit times (TOA) may be determined. Processing of actual transit times (TOA) may be used to determine the position of the acoustic energy source (e.g., T in FIG. 2) more accurately than TDOA can for the same size (aperture) of acoustic sensor array.

Time domain beamforming of the acoustic signals detected by the sensors in the ground based array may be used to locate the acoustic energy source (T in FIG. 2) in space. Such determination does not require zero latency (e.g., electromagnetic) communication with the acoustic energy source, although such communication may be provided to communicate the calculated helicopter coordinates from the ground based processing unit 12 to the helicopter (by transceiver 16 on the helicopter H).

7. More than One Source on the Helicopter and Array of Sensors on the Ground In another example implementation, each acoustic source in a plurality of spaced apart acoustic sources on the helicopter transmits a differently coded signal, in some embodiments simultaneously with each other. The source codes are available on the ground (e.g., in ground based signal processing circuitry 12) for the production of a replica of each transmitted coded signal for cross correlation with the signals detected by each ground based sensor (R1 through R4 in FIG. 2). The signals detected by each of the acoustic sensors R1-R4 can thus be used obtain the current position of each acoustic energy source using TDOA or using TOA if a zero latency synchronization signal is available. The positions of the spaced apart acoustic sources on the helicopter are such that yaw, pitch and roll will affect the actual and measurable distance between each such source and a selected position on the ground. Because the position of each acoustic energy source (A1, A2, A3) on the helicopter with respect to the center of rotation of the helicopter is known, the yaw, pitch and roll of the helicopter may be determined using the individual source to sensor distances calculated as explained above.

If an array of sensors on the helicopter is preferred, then at least 4 acoustic energy sources are required on the ground for TDOA processing or 3 sources for TOA processing.

Each acoustic energy source on the helicopter may transmit the same acoustic signal simultaneously. The total signal detected at any sensor on the ground may be delayed by an amount proportional to a calculated transit time to that sensor from an assumed acoustic energy source position. The total of the signals is summed over the receivers. This is repeated as the time delay for all points in the volume of interest is calculated and used to delay the detected signals from each sensor. The source positions appear as maxima in the summed signals. In this way positions of the sources on the helicopter may be determined from the detected acoustic signals on the ground in both range and angle. The resolution will depend on the size of the sensor aperture. This allows both the position of the center of rotation of the helicopter and the yaw, pitch and roll to be extracted. This is referred to as time domain beamforming and the process does not require zero latency communication with the acoustic energy source, other than to make the calculated results available to the helicopter operator.

8. Several Narrow Band Sources on Ground, Directional Receiver on Helicopter In another example implementation as briefly described above, several sources of narrow band acoustic signals are disposed on the ground in a selected pattern and a directional receiver is disposed on the helicopter. The directional receiver may be disposed on a stabilized mounting. Each acoustic energy source may transmit a continuous signal at single frequency slightly different from the frequency of the other acoustic energy sources. The angles from the receiver to each source are measured by scanning the receiver beam. This process does not require zero latency communication with the acoustic energy sources. The process provides the coordinates of the receiver on the helicopter with respect to the center of the ground array of acoustic sources. The present example implementation may be used in conjunction with other implementations described herein so as to provide increased robustness against brownouts.

9. Signal to Noise and Accuracy of Measurement of TOA and TDOA

Error in the measurement of the time position of the cross correlation peak may be between 1 and 5 sample intervals at a 400 kHz digitizing sample rate of the detected sensor signals Here in this section these values are justified.

The accuracy with which either the TOA or TDOA can be measured depends on the signal to noise. To clarify what, in the present context, is the relevant signal to noise consider the following. The coded signal that is radiated by a source may be denoted by x. The signal received at a sensor may be denoted by X and is the sum of all the arrivals such as coded signals from the various acoustic sources and noise from the helicopter. The signal to noise $(S/N)_0$ of x present in X may be small and even negative depending mainly on the attenuation and the helicopter noise.

$$(S/N)_0 = 10\log_{10}\left(\frac{\text{energy in } x}{\text{energy in } X}\right) \quad (1)$$

In order to detect the position in time of the peak in the cross correlation of x with X, the cross correlation processing gain is preferably large. The longer the duration of x, the larger the processing gain. In some embodiments, the processing gain may be as large as 40 dB.

$$(S/N)_{cc} = 10\log_{10}\left(\frac{\text{energy in cross correlation of } ax \text{ with } x}{\text{energy in cross correlation of } ax \text{ with } X}\right) \quad (2)$$

Herein below the relationship of $(S/N)_{cc}$ with respect to various parameters will be reviewed (a in the above equation for S/N is an arbitrary multiplier).

10. Noise Amplitudes Close to the Helicopter

*Noise Measurements data analysis and control of MI-2 helicopter aircraft*, G. M. Ashawesh, S. R. Gashoot, A. A. Kurban, 11th International Conf. on. Vibration Problems, Z Dimitrovova et al Eds., Lisbon, Portugal 9-12 Sep. 2013 describes octave band measurements of noise levels close (within 5 meters) to a helicopter on the ground at various engine speeds. This allows an estimate of the noise spectral density in the range of interest here. In the octave band from 11.3 to 22.7 kHz the sound level is 91 dBA at 5 m from the helicopter nose which translates into a noise spectral density as 51 dBA re 20 µPa² per Hz at 5 meters. The actual sound pressure level (SPL) in the range of interest is higher than the dBA levels. The NSD will be taken as 55 dB re 20 µPa² per Hz at 5 meters.

If the atmospheric attenuation at 20 kHz is assumed to be 0.6 dB/m (at 40° C. and 20% humidity) then over 50 meters the signal loss is about 30 dB. The attenuation due to fog, rain or snow is considered to be small except insofar as such conditions affect the humidity.

On the basis of the information in *Attenuation and dispersion of acoustic energy by atmospheric dust*, D. C. Henley and G. B. Hoildale, *J. Acoust. Soc. Amer.* 54, 2, 437-445, (1973), the attenuation at 20 kHz in zero visibility due to sand content in the air is taken as 0.4 dB per meter.

11. Analysis of Case of One Source on Helicopter and Array of Receivers on the Ground A source which radiates $W_0$ watts as a random signal of bandwidth BW and of duration T secs has a source level $$SL = 20\log_{10}\left(\frac{P_0}{P_{ref}}\right) + 10\log_{10}(BW) \text{ dB } re \text{ } 20 \text{ µPa @ 1 m} \quad (3)$$

The power radiated W is $$W = \frac{4\pi}{\rho c}P^2; \rho c = 410 \text{ for air.} \quad (4)$$

$$W = \left(\frac{4\pi}{\rho c}\right)10^{SL/10} \quad (5)$$

The signal to noise out of the sensor is $$(S/N)_0 = SL - 20\log_{10} R - \alpha R - (NL - 20\log_{10} R) \quad (6)$$

where R is the range in m, α is the attenuation in dB/m. The noise level NL is that close to the helicopter with:

$$NL = NSD + 10\log_{10}(BW) \quad (7)$$

The NSD 5 meters from the helicopter is about 55 dB re 20 µPa² per Hz

The attenuation will be taken as 1 dB per meter to represent the largest value expected due to the temperature, humidity and sand content. The bandwidth is that required to transmit and receive a coded signal from 10 Khz to 20 kHz (BW=10 kHz). Its duration may be about T=0.25 secs (This allows 4 updates per second). The duration of T=0.25 secs corresponds to $10^4$ points at the Nyquist $F_{NQ}$=40 kHz sampling rate.

The sensor will be assumed to be a point receiver. The signal to noise at the receiver is:

$$(S/N)_0 = SL - 20\log_{10}R - \alpha R - (NSD + 10\log_{10}(BW) - 20\log_{10}R) \quad (8)$$

$(S/N)_0$ can also be written as $$(S/N)_0 = 10\log_{10}\left(\frac{\text{energy in }x}{\text{energy in }X}\right) =$$

$$10\log_{10}\left(\frac{\sigma_x^2 N_p}{\sigma_X^2 N_p}\right) = 10\log_{10}\left(\frac{\sigma_x^2}{\sigma_X^2}\right) = 10\log_{10}\left(\frac{\sigma_x^2}{\sigma_x^2 N_s}\right) = 10\log_{10}(N_s) \quad (9)$$

x(t) is the transmitted signal of duration Np independent points whose arrival time is required and it is immersed in X(t), the helicopter noise, where variance of X(t) is $N_s$ times the variance of x(t). So $N_s$ is $$N_s = 10^{(-S/N)_0/10} \quad (10)$$

After cross correlation of the received signal with a replica transmitted signal, the time position of the cross correlation peak is to be found against a background of low level cross correlation. The signal to noise relevant for the detection of the cross correlation peak is provided by the expression:

$$(S/N)_{cc} = 10\log_{10}\left(\frac{\text{energy in cross correlation of }ax\text{ with }x}{\text{energy in cross correlation of }ax\text{ with }X}\right) \quad (11)$$

$$(S/N)_{cc} = 10\log_{10}\left(\frac{(a\sum x^2)^2}{(\sigma_X \sigma_R)^2 N_p}\right) =$$

$$10\log_{10}\left(\frac{(aN_p\sigma_x^2)^2}{\left(\left(\sqrt{\sigma_x^2 N_s}\right)a\sigma_x\right)^2 N_p}\right) = 10\log_{10}\left(\frac{N_p}{N_s}\right)$$

where $\sigma_R$ is the standard deviation of the replica and $N_p$ is equivalent to the time bandwidth product. The processing gain is thus:

$$G = 10\log_{10}(N_p) = 10\log_{10}(TF_{NQ}/2) \quad (12)$$

If the $(S/N)_{cc} > 20$ dB then the time position of the peak can be obtained to about 0.1 of the Nyquist frequency sampling interval. This can either be done by sampling at the Nyquist frequency and then interpolating the time position or by sampling directly at a multiple (e.g., 10 times) of the Nyquist frequency, e.g., 400 kHz.

In the worst case of zero visibility due to dust clouds, the acoustic source on the helicopter at 30 m above the ground would need to radiate about 20 watts to obtain the S/N for adequate time of arrival measurement.

12. Effect of Temperature and Wind Speed

The sound speed increases with temperature by about 0.6 m/s for each degree centigrade temperature rise. If the assumed sound speed is for a temperature which is incorrect by a few degrees, the effect is small and can be corrected for readily if the temperature is monitored.

Assuming the wind is mostly horizontal, the effect on sound speed of a largely constant wind, is not important. However, the movement of air due to helicopter itself is unknown but may be combatted by using a moving average of the extracted data.

The duration of a transmitted noise sequence may be about 0.25 secs in order to obtain both the amplitude gain on compression and to afford separation of the sequence compression for different codes.

If, for example, 10 successive transmissions from one source each has its own code, then the repetition interval between the transmission of noise sequences, each 0.25 secs long, can be reduced from 0.25 secs to 0.025 secs.

In this way, meaningful and timely moving averages may be obtained which reduce statistical variations in air movements speeds due to the helicopter downdraft and will also reduce the effect of transit time measurement errors.

13. Practical Aspects of Sensor Deployment

For the case of ground located sensor array, the sensor may be located around the circumference of a circle. If TDOA is used, a centrally located reference sensor may also be present.

An important aspect of the deployment is that sensors are acoustically isolated from each other. For example, if sensors are mounted on a rigid framework, then signals received at one sensor may be transmitted through the framework to the other sensors at speeds much greater than through-air speeds. This would make analysis of the detected signals impracticable. So it is suggested that the receivers are pre-mounted on acoustically isolating material, e.g., ropes, which when stretched out form the required array geometry.

If the sensors are to be mounted on the helicopter good attention must be made to acoustically isolate them from the helicopter. Acoustic isolation of sources is desirable but not as critical as for the sensors.

14. Multiples

Multiples are those signals that arrive after the direct arrival and have been scattered/reflected from another part of the helicopter or from an object near the helicopter. Their amplitudes may be less than that of the direct arrival particularly so with the attenuations expected. A particular situation is when the helicopter is at small heights. Then, multiples between the helicopter and the ground are expected. But even at very short distances, the first multiple will be well separated in time from the direct arrival. However, if a multiple is so delayed that it arrives earlier than the direct arrival of the subsequent transmission, there could be a problem. Its small amplitude could be used to reject it. A more robust method is simply to give different codes to contiguous transmissions, so such long time multiples would not be seen.

Giving different codes to contiguous transmission is suggested as a way to increase the data rate. As explained above, this is a way to combat the effect of disturbed air due to helicopter downdrafts. Further, the helicopter velocity vector determination would benefit.

15. Covertness

The low level of the transmitted sound, made possible by distributing its energy over time, together with high attenuation as range increases beyond the vicinity of the landing area allows a measure of covertness. As explained above, the radiated signal from the source is well below that of the helicopter as seen by the value of the $(S/N)_0$. The transmission loss from source to say 40 m due to spherical spreading is 32 dB and the loss due to absorption in the air is about 24 dB.

At double the range (e.g., 80 m), the spherical spreading loss is 38 dB, an increase of 6 dB whereas the absorption loss is 48 dB, which is doubled.

Thus the very rapid increase of absorption loss means the landing aid noise sequences will be undetected at modest ranges from the sources. If anything will deny covertness, it is the helicopter noise itself, being emphasized at frequencies well below 10 kHz which are subject to low atmospheric attenuation, rather than any noise radiated from loudspeakers.

16. Extraction of Coordinates from Time Measurements (TOA and TDOA) Single Source on Helicopter and Array of Point Receivers on the Ground The ground array may consist of N sensors distributed around the circumference of a circle. If TDOA is used then there is a central receiver which acts as a reference receiver.

Extraction of estimated coordinates of the source on the helicopter Xe, Ye, Ze using N measured values of TDOA, $T_i$, i=1:N may be performed using the following expression:

$$F_i = T_i - \{\sqrt{X_e^2 + Y_e^2 + Z_e^2} - \sqrt{((X_e - x_i)^2 + (Y_e - y_i)^2 + Z_e^2)}\} = F_i(X_e, Y_e, Z_e) \quad (13)$$

The solution for Xe, Ye, Ze may be obtained by setting all the $F_i=0$, and then using optimization techniques. In the case of TOA, extraction of estimated coordinate of the source Xe, Ye, Ze using N measured values of TOA, $T_i$, i=1:N using the following expression:

$$F_i = T_i - \{\sqrt{((X_e - x_i)^2 + (Y_e - y_i)^2 + Z_e^2)}\} = F_i(X_e, Y_e, Z_e) \quad (14)$$

The solution for Xe, Ye, Ze may be obtained by setting all the $F_i=0$ and then using optimization techniques.

17. More than One Source on Helicopter and Array of Point Receivers on the Ground A number Nh of acoustic energy sources on the helicopter may be at known displaced positions with respect to the helicopter center of rotation. The ground array may comprise N sensors distributed around the circumference of a circle. If TDOA is used then a central sensor which acts as a reference receiver may be disposed in the center of the circle.

The extraction procedure described below is for TOA. The procedure may be readily adapted to TDOA.

The position of, e.g., source number 1 on the helicopter is described by its coordinates (X10, Y10, Z10) relative to the center of rotation (0,0,0) in the undisturbed situation. The undisturbed situation is when the yaw ($\alpha$), the pitch ($\beta$) and the roll ($\gamma$) are all zero.

When $\alpha$, $\beta$, $\gamma$ are not zero, then the relative position of a source becomes (X1,Y1,Z1) while the center of rotation remains at (0,0,0).

The actual coordinates of the center of rotation are X0,Y0,Z0 where the origin is the center of the array of sensors in the ground array. So, the actual coordinates of source 1 are ($\mathcal{X}1=X1+X0$, $\mathcal{Y}1=Y1+Y0$, $\mathcal{Z}1=Z1+Z0$).

The yaw, pitch and roll transform the relative coordinates of source1 for example from (X10, Y10, Z10) to (X1,Y1,Z1) via the operation shown in equation 15 where (X1,Y1,Z1) are again relative coordinates:

$$\begin{pmatrix} X1 \\ Y1 \\ Z1 \end{pmatrix} = \begin{pmatrix} a11 & a12 & a12 \\ a21 & a22 & a23 \\ a31 & a32 & a33 \end{pmatrix} \begin{pmatrix} X10 \\ Y10 \\ Z10 \end{pmatrix} \quad (15)$$

where a11=cos $\alpha$ cos $\beta$ a12=cos $\alpha$ sin $\beta$ sin $\gamma$−sin $\alpha$ cos $\gamma$ a13=cos $\alpha$ sin $\beta$ cos $\gamma$+sin $\alpha$ sin $\gamma$; a21=sin $\alpha$ cos $\beta$ a22=sin $\alpha$ sin $\beta$ sin $\gamma$+cos $\alpha$ cos $\gamma$ a23=sin $\alpha$ sin $\beta$ cos $\gamma$−cos $\alpha$ sin $\gamma$; a31=−sin $\beta$ a32=cos $\beta$ sin $\gamma$ a33=cos $\beta$ cos $\gamma$ The travel times from a source at ($\mathcal{X}j$, $\mathcal{Y}j$, $\mathcal{Z}j$) to a receiver at (xi,yi,0), expressed as a distance is:

$$dji = \sqrt{(\mathcal{X}j - xi)^2 + (\mathcal{Y}j - yi)^2 + \mathcal{Z}_{6j}^2} \quad (16)$$

and its measured counterpart is $(dji)_m$. For each source j there are N equations and their estimated coordinates ($\mathcal{X}ej$, $\mathcal{Y}ej$, $\mathcal{Z}ej$) are extracted using an optimization procedure $$0 = (dji)_m - \sqrt{(\mathcal{X}_{ej} - xi)^2 + (\mathcal{Y}_{ej} - yi)^2 + \mathcal{Z}_{ej}^2} \quad (17)$$

Once the source coordinates are extracted, then the values of $\alpha$, $\beta$, $\gamma$ and the coordinates (X0,Y0,Z0) of the centre of rotation may be extracted as follows.

$$\begin{pmatrix} \mathcal{X}e1 - X0 \\ \mathcal{Y}e1 - Y0 \\ \mathcal{Z}e1 - Z0 \end{pmatrix} = \begin{pmatrix} a11 & a12 & a12 \\ a21 & a22 & a23 \\ a31 & a32 & a33 \end{pmatrix} \begin{pmatrix} X10 \\ Y10 \\ Z10 \end{pmatrix} \quad (18)$$

The unknowns are $\alpha$, $\beta$, $\gamma$ and X0,Y0,Z0. There are 3 equations for each source giving 3Nh equations for 6 unknowns.

18. Extraction of Coordinates from the Measurements, Narrowband, Angular Measurement Several sources of narrow band acoustic signals are disposed on the ground in a selected pattern and a directional receiver is disposed on the helicopter. The location of the i sources, as observed by the directional array on the helicopter, are at $X_i$, $Y_i$, $Z_i$ where $$X_i = R_i \cos \theta_i \sin \phi_i = R_i X_{ai}; Y_i = R_i \sin \theta_i \sin \phi_i = R_i Y_{ai};$$
$$Z_i = R_i \cos \phi_i$$

with $R_i = \sqrt{(X_i^2 + Y_i^2 + Z_i^2)}$ \quad (19)

The angle $\phi_i$ can be expressed as $$\phi_i = \sin^{-1}\left(\sqrt{X_{ai}^2 + Y_{ai}^2}\right) = \tan^{-1}\left(\frac{\sqrt{X_i^2 + Y_i^2}}{Z_i}\right) \quad (20)$$

It is known that $X_i = X_{oi} + X_T$ and $Y_i = Y_{oi} + Y_T$ and $Z_i = Z_T$ where ($X_T$, $Y_T$, $Z_T$) are the coordinates of the reference point in the ground array (source 1) relative to the center of the ground array and $X_{oi}$ and $Y_{oi}$ are the positions of the sources relative to the reference point within the ground array.

Thus the extraction procedure for ($X_T$, $Y_T$, $Z_T$) is to solve the equations by optimization, the number of equations is the same as the number of sources.

$$\frac{((X_{oi} + X_T)^2 + (Y_{oi} + Y_T)^2)}{Z_T^2} - \frac{X_{ai}^2 + Y_{ai}^2}{1 - (X_{ai}^2 + Y_{ai}^2)} = 0 \quad (21)$$

19. Required Signal to Noise Ratio

The standard deviation of the angle obtained from the beam pattern maximum depends on the size of the array and the signal to noise. An expression for this is given by the expression:

$$\sigma \geq \sqrt{\frac{12}{\left(\frac{S}{N}\right)(2\pi D/\lambda)^2}} \qquad (22)$$

where D is the diameter of the sensor, and S/N is the signal to noise at the output of the sensor.

Simulations indicate that a standard deviation between 0.1 and 0.3 degrees is desirable. This translates into a S/N requirement of 42 dB for 0.10, 30 dB for 0.20 and 23 dB for 0.30 for an array 30 wavelengths diameter,

20. Power Required to be Radiated by Sources

Here one may calculate the power required to be radiated by each source to give a particular S/N at the output of a sensor at 30 m slant range under the worst atmospheric conditions expected.

A source radiating $W_0$ watts into a continuous wave pulse of duration T secs has a source level of:

$$SL = 20\log_{10}\left(\frac{P_0}{P_{ref}}\right) dB \ re \ 20 \ \mu Pa \ @ \ 1 \ m$$

The power radiated is $$W_0 = \frac{4\pi}{\varrho c} P_0^2;$$

$\varrho c = 410$ for air.

The signal to noise at the sensor is $$\frac{S}{N} = SL - 20\log_{10}R - \alpha R - (NL - DI) \qquad (23)$$

where R is the range in m, a is the attenuation in dB/m. The noise level NL is $$NSD + 10 \ \log_{10}(BW) \qquad (24)$$

where BW is the bandwidth and the directivity index DI for a square array of side L wavelengths is given by the expression:

$$DI = 10 \ \log_{10}(4\pi L^2) \qquad (25)$$

The NSD at the helicopter as explained above is about 55 dB re 20 $\mu Pa^2$ per Hz. The attenuation will be taken as 1 dB per m. to represent the largest value expected due to the temperature, humidity and sand content. The bandwidth is that required to transmit and receive a continuous wave pulse of duration about 0.1 secs (which allows 10 updates per second). This is BW=10 Hz and corresponds to 2000 cycles at 20 kHz.

The receiver will be taken as a square of side 30 wavelengths which at 20 kHz is about 50 cm. This gives DI=40 dB. If R=30 m is selected then for angular accuracy of 0.3 degrees, then:

$$\frac{S}{N} = SL - 20\log_{10}R - \alpha R - (NL - DI) = 23 \qquad (26)$$

$$SL = 23 + 30 + 30 + (55 + 10\log_{10}10 - 40) \qquad (27)$$

$$SL = 108 \ db \ re \ 20 \ \mu Pa \qquad (28)$$

This gives $P_0 = 10^{(108/20)} 20 \ 10^{-6} = 5.7$ Pa, and thus the radiated power is W=1 watt for each source. This gives a sound pressure level at a distance on the ground from the sources of R of:

$$SPL = 20\log_{10}\left\{\frac{\sqrt{\frac{\varrho c W}{2\pi R^2}}}{20 \ 10^{-6}}\right\} + 10\log_{10}(N) \qquad (29)$$

where N=number of sources.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining an aircraft position with reference to a location on the ground, comprising:
   transmitting a first acoustic signal from the aircraft to an array of spaced apart acoustic sensors proximate the location on the ground;
   at least one of (i) determining a time difference of arrival of the acoustic signal between each of the array of acoustic sensors and a reference acoustic sensor and (ii) determining an arrival time of the acoustic signal at each of the spaced apart acoustic sensors;
   determining the position of the aircraft from the time difference of arrival or the arrival time;
   transmitting a second acoustic signal from each of a plurality of spaced apart transmitter positions on the aircraft, each of the second acoustic signals being coded to enable separate identification of each second transmitted signal in a composite signal detected by each of the plurality of spaced apart acoustic sensors;
   determining either a time difference of arrival or an arrival time of each of the plurality of second transmitted signals;
   determining the position of the aircraft and pitch, roll and yaw of the aircraft using the time difference of arrival or the time of arrival of each of the plurality of second transmitted signals, wherein a length of each of the second transmitted signals is selected to enable a radiated power of each coded transmitted signal to be less than an ambient noise level at the aircraft.

2. The method of claim 1 wherein the time of arrival is determined using a zero latency synchronization signal communicated between the aircraft and the location on the ground.

3. The method of claim 1 wherein an arrival time of each of the second acoustic signals is determined by cross correlation of the signal detected by each acoustic sensor with a replica of each of the second acoustic signals and determining a time of a peak of a value of the cross-correlation.

4. The method of claim 1 wherein each of the second acoustic signals has zero cross correlation with any of the other second acoustic signals.

5. The method of claim 1 wherein the coded transmitted signals comprise at least one of Gold code, Kasami code and maximum length code.

6. An apparatus for determining an aircraft position with respect to a location on the ground comprising:
- a plurality of spaced apart acoustic transmitters on the aircraft;
- an array of acoustic sensors arranged in a selected pattern proximate the location on the ground and in signal communication with a first signal processing unit;
- each of the acoustic transmitters in communication with a second signal processing unit on the aircraft to enable each acoustic transmitter to transmit a signal being coded to enable separate identification of each transmitted signal in a composite signal detected by each acoustic sensor in the array;
- the signal processing unit arranged to determine at least one of (i) a time difference of arrival of the acoustic signal between each of the acoustic sensors and a reference acoustic sensor and (ii) an arrival time of the acoustic signal at each of the spaced apart acoustic sensors;
- the second signal processing unit arranged to determine the aircraft position using the determined time differences of arrival or the arrival time; and
- the first signal processing unit arranged to determine the pitch, roll and yaw of the aircraft using the time difference of arrival or the time of arrival of each of the plurality of transmitted signals, wherein a length of the coded signals is selected to enable a radiated power of each coded signal to be less than an ambient noise level at the aircraft.

7. The apparatus of claim 6 further comprising a zero latency synchronization signal transmitter disposed on the aircraft in signal communication with the first signal processing unit.

8. The apparatus of claim 6 wherein the first signal processing unit is arranged to determine an arrival time of each acoustic signal by cross correlation of the signal detected by each sensor with a replica of each of the coded transmitted signals and to determine a time of a peak of a value of the cross-correlation.

9. The apparatus of claim 6 wherein each of the coded signals has zero cross correlation with any of the other coded signals.

10. The apparatus of claim 6 wherein the coded signals comprise at least one of Gold code, Kasami code and maximum length code.

* * * * *